Patented Feb. 23, 1932

1,846,820

UNITED STATES PATENT OFFICE

JOSHUA F. DARLING, OF WOODSTOWN, NEW JERSEY, AND DONALD H. POWERS, OF PROVIDENCE, RHODE ISLAND, ASSIGNORS TO E. I. DU PONT DE NEMOURS & COMPANY, OF WILMINGTON, DELAWARE, A CORPORATION OF DELAWARE

PROCESS AND PRODUCT FOR COLORING RUBBER

No Drawing. Application filed September 15, 1930. Serial No. 482,152.

This invention relates to the process of preparing insoluble coloring compounds in a condition particularly suitable for use in rubber goods and the resulting product, and, more particularly, it relates to the process of preparing organic dyestuffs or their lakes in such a state that they may be easily dispersed in rubber.

This application is a continuation in part of an application filed by the same inventors December 21, 1927, Serial #241,736.

It has long been known that certain organic dyestuffs may be incorporated with rubber during the milling prior to vulcanization to yield colored vulcanized rubber (U. S. P. 1,113,614; 1,342,457; 1,559,343). In the preparation of such organic pigments it has been the common practice to precipitate them from a water solution, filter, dry and grind to a certain degree of fineness. Pigments so prepared have been unsatisfactory since in the course of drying, the particles agglomerate and grinding even under the best conditions, does not restore them to their original degree of fineness. The color as it is ordinarily obtained is composed of large particles of more or less irregular size and which are not ground to a fineness below 200 mesh.

If the pigment is soluble in rubber the colored stock bleeds and the resulting material is unsatisfactory for most purposes. If the pigment is insoluble it is extremely difficult to disperse the powder uniformly through the rubber. On account of this incomplete dispersion, it has been necessary to employ a relatively high percentage of the pigment to impart a bright color to the stock into which it was milled.

It has been further shown that pigments prepared by drying and grinding may be mixed with latex prior to compounding in order to minimize the amount of milling necessary to secure thorough incorporation (U. S. P. 1,558,688). Investigation has shown that, if the fine dry color which has been prepared and ground according to this practice is added to the latex and the product coagulated, no substantial improvement in coloring power is obtained. Adding the dry color to the latex offers a convenient method of incorporating the color, but does not improve the tinctorial power and fastness.

In this state of the art the object of the present invention is to prepare a color which will disperse easily, uniformly and quickly in the rubber. A further object is an improvement upon the known process of grinding a dry color to a fine degree. A still further object is the preparation of a color in such a condition that it will have a distinctly increased tinctorial power, and disperse in practically colloidal dimensions. A further object is the production of a product which may be readily blended and standardized for use in rubber goods so that, instead of using a single color paste, several pastes may be mixed and the amounts employed varied according to the strength of the particular batch in question.

With these objects in view, it has been found that the product resulting from mixing with latex an aqueous colloidal suspension of a water insoluble color, coagulating and milling possesses important advantages over the products hitherto obtained by merely mixing with latex the finely ground materials heretofore employed.

The criterion as to the satisfactory nature of the suspension of color satisfactory for use in this connection is whether or not it is colloidal. The particular method by which the colloidal solution or suspension of the color is produced is, therefore, immaterial. A large number of such methods are known among which may be mentioned wet grinding in a colloidal mill and precipitating from solution, for example, with vat colors, dissolving in sulfuric acid and reprecipitating. In view of the difficulties and expense encountered in grinding to colloidal size, however, the use of the color in its original precipitated condition is preferred. This method of carrying out the invention is at once economical and highly effective. The invention will therefore be described hereinafter with particular reference to this modification.

The color as first precipitated is in an extremely finely divided state. The average particle is of colloidal dimension and of the order of one hundredth of the size of the particle ground in the ordinary mill to pass through a 200 mesh screen. It has been found that, if this original aqueous suspension of a color is mixed with latex the mixture coagulates either in the form of a slurry or in lumps, and can be filtered. This product when dried may be mixed with rubber as on a mill and the colored stock which is obtained is free from spots and of a remarkable bright shade.

Moreover it has been found that when the coagulated latex containing colloidal coloring material is thoroughly milled the resulting product will not only disperse much more easily, uniformally and quickly than the unmilled produce but is also plasticized. The step of milling as will appear below, is therefore of the utmost importance.

The surprising discovery has been made that a color prepared as outlined above has, in most instances, at least twice the tinctorial power of the same color dried, ground and milled in accordance with the present practice. It is satisfactory for use where the manufacture of very thin sheets of rubber is contemplated. Under such circumstances the spotting effect of the coarser materials heretofore employed is particularly evident.

It is surprising that in most cases no coagulant is necessary to render the resulting mixture suitable for filtration. While latex itself cannot be filtered on an ordinary filter, a mixture of the latex and color can usually be filtered easily. It is believed, although the invention is independent of the correctness of this theory, that, in some cases, the color coats the droplets of rubber and, in other cases, the rubber coats the color particles. It is further possible that under certain conditions a final product is obtained consisting of fine particles of color interspersed through the globules of rubber. It has been shown, in the case of powders, that the more finely divided substance has a tendency to coat the coarser one. The globules of rubber latex have been shown to be 1–3μ in size and the particles of color in many cases are of smaller cross sectional diameter.

In order to more clearly disclose the invention, the following embodiments thereof are furnished for illustrative purposes.

*Example I.*—To one thousand pounds of a 10% suspension of an undried precipitate of Algol red R (Schultz No. 819) agitated in a kettle, three hundred pounds of thirty-three percent rubber latex is slowly added. The viscosity of the mixture increases slightly but no other change is noted. After fifteen minutes' agitation the product is filtered, dried in a vacuum oven and milled in an open two roll rubber mill for about 30 minutes. The resulting product, containing about 50% dyestuff, is practically as high in tinctorial power as an equal weight of pure dyestuff which has been filtered without this treatment, and dried and ground to 200 mesh.

*Example II.*—Five hundred pounds of a 12% suspension of an undried precipitate of Helindone orange R (Schultz No. 913) is agitated in a kettle and three hundred pounds of twenty percent rubber latex is slowly added. The mixture becomes much more viscous and is difficult to filter. Enough dilute acetic acid is slowly added, after the mixture has been stirred for ten minutes, to make it faintly acid to litmus and the product pressed on a filter and dried. When thoroughly milled as in Example I this product gives a very bright shade when one-half of one percent is incorporated with the rubber.

*Example III.*—Two thousand pounds of a 5% suspension of the undried precipitate of the phosphotungstate lake of methyl violet (Schultz No. 515) is agitated and two hundred pounds of 36% rubber latex is slowly added. The product is thoroughly mixed and is easily filtered. When dried and thoroughly milled the brightness and fastness of this product in certain stocks has been found to be over twice that of the pure dry lake of methyl violet.

*Example IV.*—One thousand pounds of crude indanthrene golden orange R (Schultz No. 761), is dissolved in ten parts of sulfuric acid monohydrate. This solution is drowned in a large amount of water containing a peptizing agent under such conditions that the color is dispersed in a colloidal condition. This colloidal suspension is mixed with the rubber latex and after thorough mixing acetic acid is carefully added. The coagulum is then dried and milled. The coagulum obtained in this way consists of rubber with the color colloidally dispersed through it and gives remarkably bright and even shades when incorporated with rubber.

This same color, when dried, before mixing with latex and repeatedly ground in a limited mill, on mixing with rubber gives a stock which is spotted and requires four times as much color to give the same shade.

*Example V.*—The following example illustrates the preparation of the latex color from reclaimed rubber or crude rubber.

1400 grams of first latex pale crepe (plantation rubber) was broken down for 10 minutes on a cold mill and 140 grams (10%) of soap were then added to the stock on the mill over a period of about 20 minutes. The milled latex crepe containing the soap was then placed in a hot one-half gallon Werner and Pfliederer mixer and 50 c. c. of distilled water added every 10 minutes until complete dispersion was obtained. In this instance 1900 c. c. of water was required when dispersion was completed 20% of concentrated aqueous ammonia was added to increase the stability.

The dispersed first latex pale crepe so obtained was then diluted in a weak ammonical solution and colloid milled dye paste in the ratio of 40% color (dry basis) to 60% rubber (dry basis) was added with thorough mixing. Coagulation was accomplished by addition of acetic acid. The resulting product was then thoroughly milled to yield a product similar in properties to that obtainable from natural latex.

If desired, in carrying out the process of this invention, the color may be precipitated in a water solution in the presence of a trace of protective agent such as gelatine, glue or saponine. The resulting colloidal suspension cannot be filtered by ordinary means and, if it is allowed to dry, agglomerates and cannot be readily redispersed. However, by admixing the undried colloidal suspension with a solution of latex a product is obtained which may be readily filtered, in most cases, even without the prior addition of a coagulant. By this process the desired product is obtained which comprises the color dispersed in latex in colloidal dimensions.

It is also possible to add the color in the form of a paste to the latex. These pastes differ from the suspensions only in the percentage of water present. They have not been dried and consequently are not agglomerated and may be easily diluted with water to form a colloidal suspension or may be added directly as pastes to the latex which is agitated to insure good mixing.

It will be evident therefore that the amount of water present with the precipitate of organic color may be varied within wide limits. The important point is that the material when ready to mix with the latex must, if heavily diluted with water, give a colloidal solution or suspension of the dye. This would mean ordinarily that the material may be sucked as dry as possible on a filter but should not be materially dried beyond this point. The residue, so dried on the filter, gives results equivalent to those obtained from the original suspension, but if the filter cake is substantially dried, it is necessary to grind it in a colloidal mill before the advantageous properties accompanying the use of the wet material can be restored.

As already stated, the dried or coagulated latex product containing the color in colloidal form must be thoroughly milled for best results. It makes little difference whether this product is coagulated and dried before milling, is coagulated and dried on hot rolls with simultaneous milling or whether the colloidal color latex mixture is merely dried by pouring over hot rolls with simultaneous milling.

The milling of the colloidal color-rubber mixture is accompanied by many important advantages. As already noted the milling not only further increases the dispersion of the color with the rubber but also plasticizes the rubber. Thus in those instances when the colloidal rubber color is to be dissolved the "swelling" action of the product in the solvent is enhanched. (The word "swelling" is used here since rubber technologists agree that so called rubber solutions are in reality rubber swollen by the solvent). This feature is of importance for example in the preparation of colored rubber cements. It has been established by actual tests that the unmilled solution in benzol of coagulated rubber containing for example colloidal naphthol yellow S (C. I. #10) does not smooth out as a cement but retains a lumpy curdled consistency whereas the milled solution makes a smooth even flowing cement.

Thus, the manufacturers of proof goods (rain coat cloth) or of dipped goods (rubber gloves), who at present in using dry ground colors must mix a separate rubber batch for every color shade employed, by using the rubber dispersed colors of the present invention may make up solutions of the various colors of such high concentrations that just one base stock need be inventoried and tinted or colored as required by adding small amounts of the rubber dispersed color solvent solutions.

Another important advantage that results from after-milling is the reduction of the unusual toughness characteristic of the unmilled product.

The unmilled dried color latex product is many times tougher than plantation rubber, native rubber or reclaimed rubber and is tougher than any of the water dispersed plantation and/or reclaimed rubber products. It is even tougher than natural latex products whether the natural latex is coagulated by any of the commonly used coagulants or dried by the latex spray process. By reason of this toughness unless milled it will not satisfactorily disperse with any of these products but will only break up as small lumps, and scatter through the main batch giving an appearance of poor dispersion in the final product.

Furthermore, the consistency of the dried color-latex will vary from a dense hard cake to irregular hard lumps with adherent dry hard particles of color and rubber. These can be cut with difficulty, and even if such a product could be used directly, this condition would slow up weighing room operations so badly that this objection alone would prohibit its use in most rubber factories.

The unmilled dried color-latex product also resists water dispersion but may be dispersed in water after milling.

A final and extremely important advantage in after-milling is the preservation of the stocks. In the preparation of plantation rubbers two methods are generally used to preserve it from molding; it is either smoked or treated with some anti-ferment or anti-mold growth material such as sodium bisulphite. The native South American rubber is smoked. To our great surprise we have found that by milling our dried and/or coagulated color rubber products we are able to prevent decomposition. Mold growth develops on all of our rubber dispersed colors and some ferment if they receive no treatment following drying, but we have had no cases of fermentation or mold growth after the product has been milled.

Our standard practice of after milling is to place from 50 to 75 pounds of colloid milled-latex coagulated-dried rubber dispersed color on a 60 inch, open two-roll rubber mill, driven by a 100 horse-power motor, and mill it for 30 minutes. This is repeated until the whole charge or lot has been milled. Then a total of 75 pounds of proportional amounts of each mill load are again placed on the rolls and milled for 15 minutes. This is done to blend all parts of the charge and to mill the rubber further. The batch is later standardized by the addition of plantation rubber. Any practice accomplishing substantially the same result may of course be followed, however.

When so milled a product is obtained having none of the disadvantages encountered above and having unexpected coloring power, adaptability for dispersion and resistance to deterioration. It will be evident therefore that before use it is highly important if not essential that the dried latex-color be milled.

Instead of employing natural latex in the preparation of the coagulum the pigments in coloidal condition may be mixed with a synthetic latex such as described in the Dinsmore Patent No. 1,732,795. Also, as clearly appears from Example V the colloidal color may be incorporated in a suitable water dispersion of plantation or reclaimed rubber which is thereafter coagulated and milled as in the case of natural latex. It will be understood therefore that where the term "rubber latex" is employed herein it is intended to refer not only to any of the natural latices but to synthetic latex whether prepared from redispersed crude or reclaimed rubber or combinations of them or synthetic emulsions capable of giving rubber-like materials alone or with added natural latices or added non-solvent dispersions of rubber or rubber-like materials, provided the latex duplicates in physical and gross chemical properties the natural latex.

The color prepared as described herein above may be mixed with the rubber in any well known way, as on a mill, and in such proportions as required to give the desired color to the final product. Preparations of different strengths may be mixed and the product thus standardized for commercial use.

It will be understood that the resulting product is adapted for coloring all the botanical varieties of rubber and is not restricted to Hevea rubber alone. It may also be applied to synthetic rubber and reclaimed rubber.

The process is equally applicable to organic or inorganic pigments. In general, it may be stated that it is applicable to any insoluble coloring compound which can be obtained in a stable coloidal solution or suspension.

The ratio of coloring matter to rubber may be varied within wide limits. The proportion employed in the examples represent, however, the preferred range.

As many apparently widely different embodiments of this invention may be made without departing from the spirit thereof, it is to be understood that we do not limit ourselves to the foregoing examples or description except as indicated in the following patent claims.

We claim:

1. The process of preparing a water insoluble color for incorporation with rubber which comprises mixing a colloidal suspension of said color with a rubber latex, coagulating, and milling.

2. The process of preparing a water insoluble color for incorporation with rubber which comprises precipitating said color in the form of a colloidal suspension and mixing said precipitate, prior to drying, with a rubber latex.

3. The process of preparing a water insoluble color for incorporation with rubber which comprises precipitating said color in the form of a colloidal suspension and in the presence of a protective agent, and mixing said precipitate, prior to drying, with a rubber latex.

4. The process of preparing an organic dye for incorporation with rubber which comprises precipitating said dye in the form of a colloidal suspension, mixing said precipitate, prior to drying, with a rubber latex, coagulating and milling.

5. The process of preparing an organic dye for incorporation with rubber which comprises precipitating said dye in the form of a colloidal suspension and in the presence of a protective agent, mixing said suspension, prior to drying, with a rubber latex, coagulating, drying and milling.

6. A compound for coloring rubber obtainable by mixing a colloidal suspension of a water insoluble color with a rubber latex, coagulating and milling, said compound being characterized by containing the color dispersed therethru in colloidal dimensions and by its high tinctorial power.

7. A compound for coloring rubber obtainable by precipitating a water insoluble color in the form of a colloidal suspension, mixing said precipitate, prior to drying, with a rubber latex, coagulating and milling said compound being characterized by containing the color dispersed therethru in colloidal dimensions and by its high tinctorial power.

8. In the process of coloring rubber the step which comprises incorporating with the rubber the compound set forth in claim 6.

9. In the process of coloring rubber the step which comprises incorporating with the rubber the compound set forth in claim 7.

10. A colored rubber compound in solid form and containing the coloring material dispersed in colloidal dimensions uniformly throughout the body thereof, said compound being plasticized and adapted to be dispersed in substantially colloidal dimensions.

11. A colored rubber compound in solid form obtainable by incorporating with a rubber mix a coloring preparation comprising a milled dried mixture of a colloidal suspension of a water insoluble color with latex, said compound being characterized by containing the color dispersed in colloidal dimensions uniformly throughout the body thereof.

12. The process of preparing a water insoluble color for incorporation with rubber which comprises mixing said color in colloidal form with a rubber latex, coagulating and milling.

13. The process of preparing a water insoluble color for incorporation with rubber which comprises reducing said color to colloidal form, mixing the colloid with a rubber latex, coagulating and milling.

14. A colored rubber compound in solid form and containing the coloring material dispersed in colloidal dimensions uniformly throughout the body thereof, the weight of said material exceeding the weight of the rubber.

15. The process of preparing a water insoluble color for incorporation with rubber which comprises mixing a colloidal suspension of Algol red R (Schultz #819) with a rubber latex, coagulating, and milling.

16. The process of preparing a water insoluble color for incorporation with rubber which comprises mixing a colloidal suspension of methyl violet lake (Schultz #515) with a rubber latex, coagulating, and milling.

17. The process of preparing a water insoluble color for incorporation with rubber which comprises mixing a colloidal suspension of indanthrene golden orange R (Schultz #761) with a rubber latex, coagulating, and milling.

In testimony whereof we affix our signatures.

JOSHUA F. DARLING.
DONALD H. POWERS.